Feb. 28, 1933.　　　　A. N. BENN　　　　1,899,178
APPARATUS FOR SHAPING MEAT FOR SMOKING
Filed Aug. 29, 1929　　　3 Sheets-Sheet 1
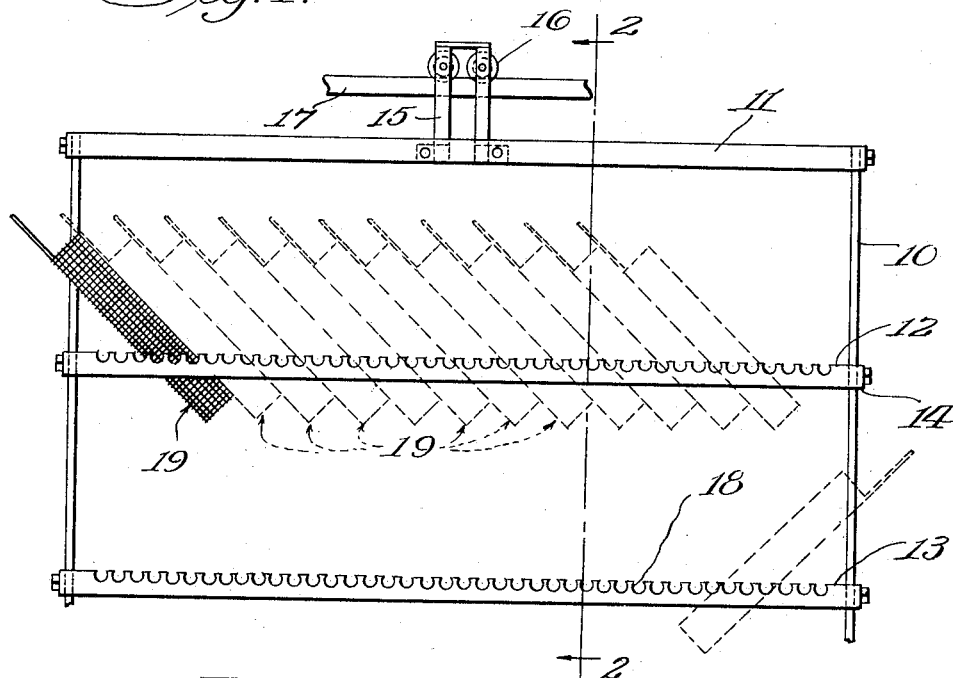
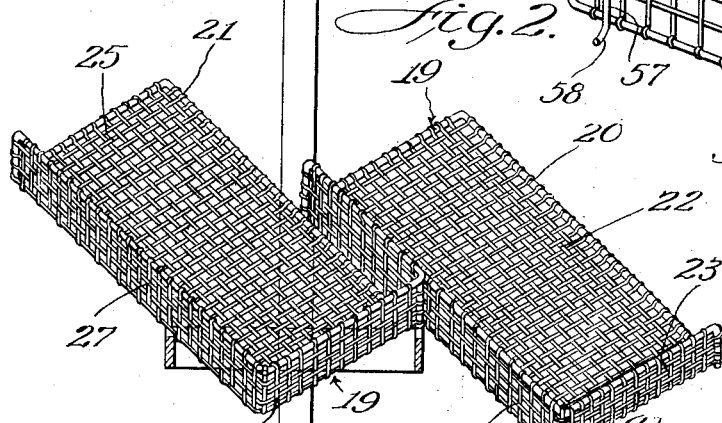
Inventor
Alonzo Newton Benn Inventor
Alonzo Newton Benn
By Rector Hibben Davis Macauley
His Attys

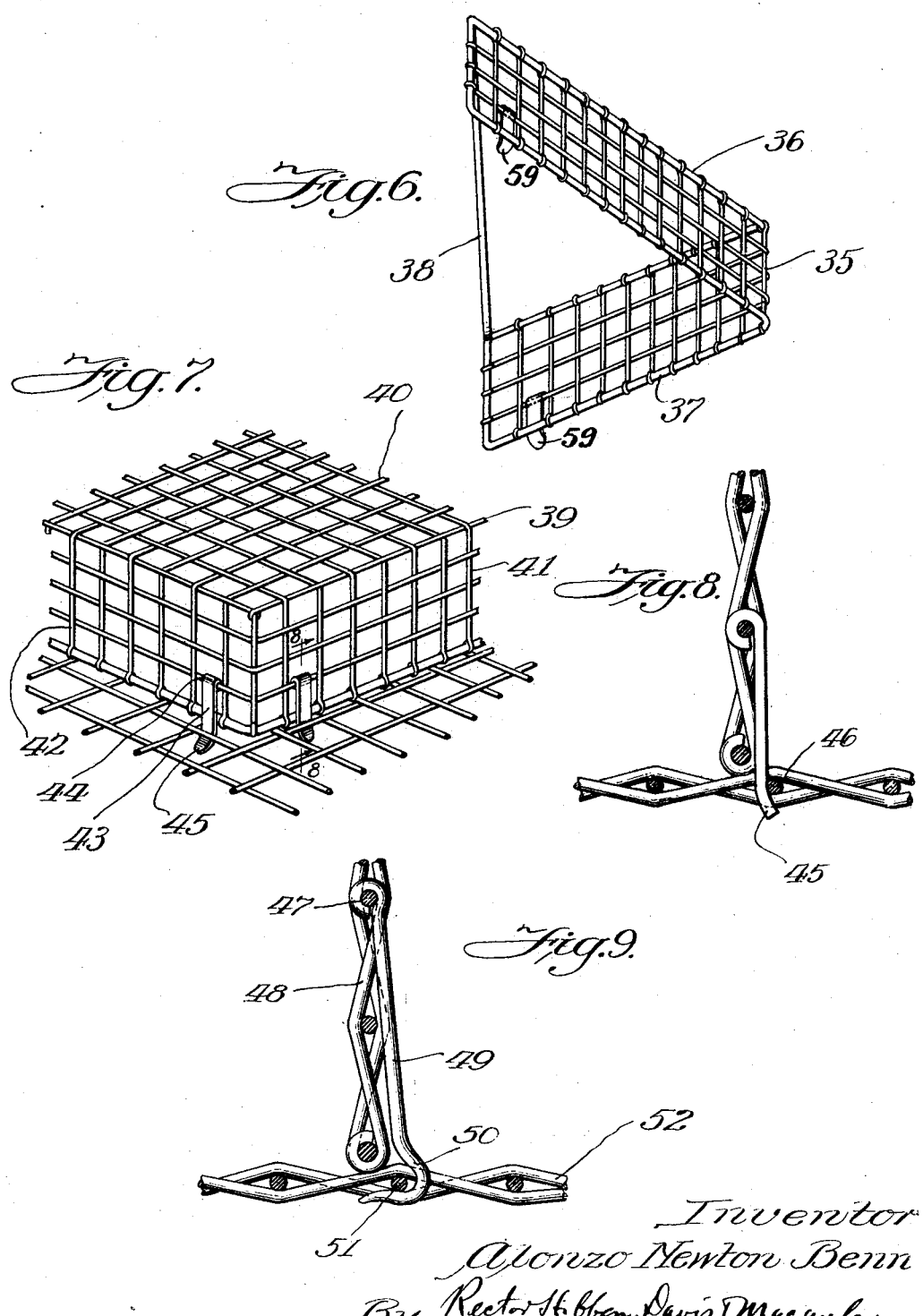

Patented Feb. 28, 1933

1,899,178

UNITED STATES PATENT OFFICE

ALONZO NEWTON BENN, OF CHICAGO, ILLINOIS

APPARATUS FOR SHAPING MEAT FOR SMOKING

Application filed August 29, 1929. Serial No. 389,157

My invention relates to an apparatus for shaping meat for smoking.

The principal object of my invention is to devise an arrangement for the carriage of meat during the smoking thereof, particularly bacon, which permits a positive, initial shaping of the meat and subsequent control thereof during the smoking process so that the final product presents a more attractive and marketable form.

A further object is to provide an improved type of basket for carrying the meat and simple, highly effective, and easily positioned devices operating therewith which initially constrain the meat into the form desired and maintain the latter during the smoking operation.

A further object is to devise a method of loading a smokehouse trolley whereby the meat is carried in a manner to effect a marked improvement in appearance and shape over that obtainable when the meat is simply suspended on hooks, and in which the load capacity of the trolley approximates that of a trolley arranged for the hook method of smoking.

The present invention is intended as an improvement on the trolley illustrated and described in my United States Letters Patent No. 1,653,539, dated December 20, 1927, principally in the way of simplification in structure and manner of handling, and improving the capacity of the trolley, and also on my copending application for smokehouse trolley, Serial No. 371,339, in respect of the devices which are utilized to constrain and shape the meat during the smoking operation.

As stated in the patent, the method of supporting meat on smokehouse trolleys in which the same is hung upon hooks which are mounted on the trolley frame is decidedly objectionable. The necessity of forcing the meat on the hooks creates holes therethrough which become elongated under the action of gravity according to different degrees with consequent distortion in the shape of the meat and the creation of an irregular outline thereof, allowing uneven contraction and displacement to take place between the fatty and lean portions of the meat. In addition to the misshapen appearance of bacon smoked according to this method, the holes formed by the hook become charred and blackened, so that this end of the meat requires considerable trimming before it can be placed in a marketable condition.

The foregoing economic waste is avoided according to the use of my structure, as well as the haphazard method of handling the bacon in order to achieve the desired shape thereof. The use of my structure permits a positive, controlled initial shaping of the comparatively soft and pliable pieces of meat prior to smoking and the subsequent holding of the shape during the latter process, so that the general appearance and shape of the bacon is greatly improved with consequent advantages from the standpoint of marketability. This initial shaping of the meat is obtained by the use of devices which are susceptible of easy and rapid positioning in the baskets which carry the meat on the trolley, with a corresponding improvement in the production rate of the smoking process.

These and further objects of my invention will be set forth in the following specification, reference being had to the accompanying drawings, and the novel means by which said objects are effectuated will be definitely pointed out in the claims.

In the drawings:

Figure 1 is a side elevation of a trolley showing the method of loading the same with a plurality of meat-holding baskets.

Fig. 2 is a section along the line 2—2 in Fig. 1, showing one basket in position on the upper supporting rails of the trolley.

Figure 3:
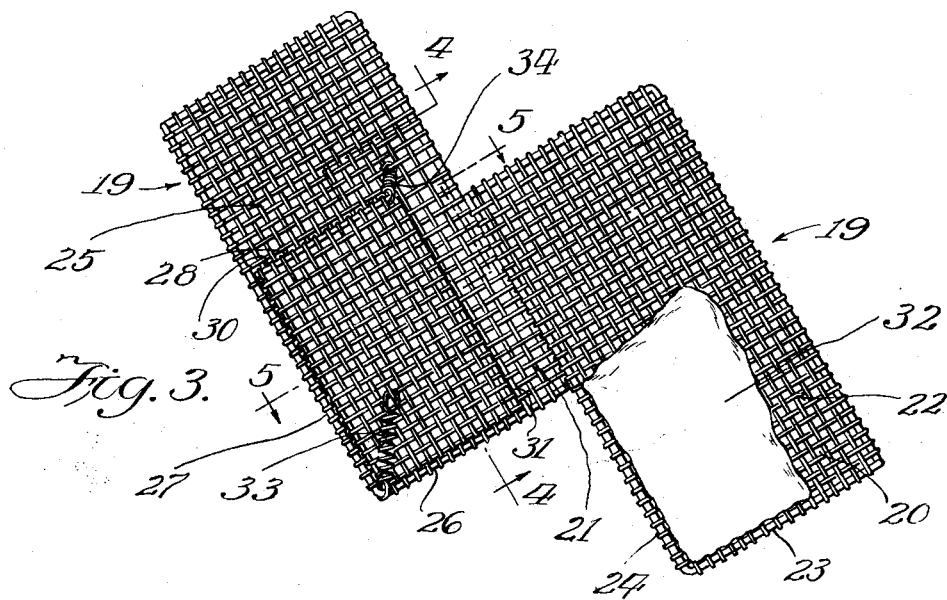

Fig. 3 is a plan view of the basket adapted for my improved trolley, which has a pair of meat-receiving compartments, one of the compartments being shown with a piece of bacon prior to the initial shaping and the other of said compartments having a similar piece of meat completely shaped according to the desired form by the improved cage member which forms one of the principal features of my invention.

Figure 4:
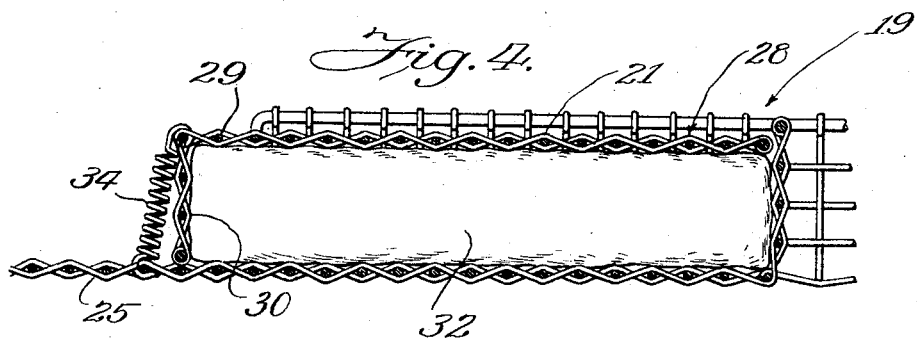
Figure 5:
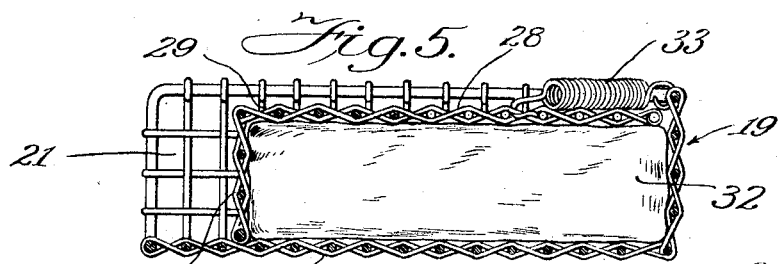

Figs. 4 and 5 are sections along the lines 4—4 and 5—5, respectively, in Fig. 3, looking in the direction of the arrows.

Fig. 6 is a perspective view of a modified form of cage member as viewed from the underside thereof.

Fig. 7 is a partial perspective view of a cage member having the general shape illustrated in Fig. 3, but provided with different devices for engaging the same with the basket.

Fig. 8 is an enlarged section along the line 8—8 in Fig. 7, looking in the direction of the arrows.

Fig. 9 is an enlarged, sectional elevation showing a further modification of the appliances for connecting the cage member to the basket.

Fig. 10 is a perspective view showing a modification of the cage member illustrated in Fig. 6, the member in the former figure comprising a pair of relatively movable portions.

Referring to the drawings, the trolley consists of a skeleton framework having upright end bars 10 which are connected by several pairs of horizontal bars, such as 11, 12 and 13, each of said pairs being connected at the ends thereof adjacent the bars 10 by crossbars 14. In Fig. 1, only three pairs of the horizontal bars are shown, but it will be understood that as many pairs thereof may be employed as desired and it will be further noted that the bars of each pair are spaced from each other, as shown clearly in Fig. 2. The trolley frame is provided with a hanger 15 in which is revolubly carried the trolley wheels 16 which run along a rail 17. The horizontal bars 12 and 13, as well as other bars which may be positioned under the bar 13, may be provided with a plurality of notches 18. The foregoing trolley frame is now in common use in the industry and in and of itself forms no part of the present invention, but it has been utilized in a novel way in combination with the improved type of basket and restraining cage member hereinafter described to effect an improved system of loading and a superior type of the finished, smoked product.

For purpose of description, the basket presently described will be denoted as being of special advantage when used in the smoking of bacon, but it will be understood that other types of meat may be employed without affecting the central thought involved.

The meat basket 19 is preferably formed of wire screening or netting having any desired mesh and gauge of wire, but is preferably formed of material of this character which will stand hard usage without distortion or loss of its shape. The use of wire screening, or any generally foraminous material, insures that the meat carried by the basket will be effectively subjected to the action of the heat and smoke during the smoking process.

Each basket is formed with a pair of compartments 20 and 21 which are displaced relative to each other in the direction of their length. The compartment 20 comprises a bottom 22, an upstanding end 23 and an upstanding side 24, thus leaving the opposite end and side free for the ready application of meat to this compartment. Similarly, the compartment 21 comprises a bottom 25, an upstanding end 26 and an upstanding side 27. Owing to the displacement of the compartment 21 with respect to the compartment 20, as shown clearly in Figs. 2 and 3, the end 26 of the former compartment joins with the side 24 of the latter compartment approximately midway of the end of said last named side. Except for the partial side of the compartment 21 established by the side 24 of the compartment 20, both compartments may be generally considered as having only one end and side, thus affording a means for quickly and easily compressing the shape of pieces of bacon placed therein according to the method which will now be described, regardless of the marginal dimensions of the pieces or the irregular outline thereof, within the maximum capacity of the several compartments.

One type of the restraining member used with my improved basket is designated by the numeral 28, as shown in Figs. 3, 4 and 5, and this member is formed of the same material as is the basket 19. The member 28 is formed generally as a partial cage of substantially rectangular shape and includes a top 29, a depending end 30 and a depending side 31. This end and side are connected at their adjacent ends to form a corner, leaving the respective, opposite marginal edges of the top 29 free of any depending portion for a purpose hereinafter explained. It will be observed, therefore, that the cage member 28 bears a general similarity to the shape and arrangement of the compartment 20 of the basket 19, if the latter were disposed in an inverted position.

When a piece of bacon is first placed in one of the compartments of the basket 19, it will have the general, irregular shape designated by the numeral 32 in Fig. 3. This shape is decidedly objectionable from a commercial standpoint, so that I propose to shape the piece of bacon according to the outline desired and smoke the same while in that condition. To effect this change in shape, piece 32 is placed in the compartment 20 so that two of its marginal edges are in contact with the end and side 23 and 24, respectively. The cage member 28 is then placed over the piece 32 with the top 29 contacting with the upper surface of said piece and the end 30 and side 31 in engagement with the then free, marginal edges of said bacon. The cage member 28 is then shifted endwise relative to the compartment 20 toward the end 23 thereof to thereby compress the bacon, which is soft and pliable at this stage of the process, between the end 23 and side 24 of the compartment 20, and the end 30 and side 31 of the cage member 28, thus reshaping the heretofore irregular piece of bacon until it assumes a shape having smooth, regular edges. When the basket 19 is loaded on the trolley in the reclined, stacked position as hereinafter described, it is contemplated that the weight of the cage member 28 will be sufficient to maintain the regular shape of the piece of bacon 32 as above described, but in order to provide a more positive, yielding compression of said piece, a coil spring 33 may be hooked at one end to some convenient portion of the top 29 and at the opposite end to the lower corner of one of the compartments, as shown clearly in Fig. 3, it being understood that the process of initially shaping the bacon as above described with reference to the compartment 20 is also followed in respect of the compartment 21, the compartment 21 in Fig. 3 showing the finished, compressed condition of the bacon prior to smoking. The spring 33 will exert a downward, pulling force on the cage 28, assuming the basket to be occupying a reclining position, substantially in the plane of the meat, thereby maintaining the cage in the intended position and constraining and regularly shaping the marginal edges of the meat between the cage and the walls of the basket. A second spring 34 may be hooked at one end to the upper diagonal corner of the cage 28, defined by the junction of the side 30 and end 31 thereof, the other end of said spring being hooked to a convenient portion of the bottom 25 of the compartment 21 immediately below the upper end of the spring, or as close to this position as the relation of the parts will permit, as shown in Fig. 4. The spring 34 functions to draw the cage towards the bottom of the compartment and thus compresses the meat in a direction substantially at right angles to that effected by the spring 33. The meat is, therefore, confined within a box-like enclosure during the smoking operation with manifest advantages in the character of the product finally obtained. By suitably positioning the springs 33 and 34, any desired degree of compressive force may be exerted against the marginal edges and upper and lower surfaces of the bacon 32, said springs also serving at the same time to retain the cage member within the several compartments of the basket 19 during handling thereof to and from the trolley.

Assuming that both compartments of the basket 19 have been loaded in the foregoing manner, the first basket will be placed on the rails 12, preferably resting in a pair of notches 18 thereof, and will be supported in a generally inclined position against the left hand end bar 10, as shown in Fig. 1. It will be observed, from Fig. 2, that the displaced arrangement of the compartments 20 and 21 permit a positioning of each basket 19 in a slightly canted position from the vertical, or one in which the compartment 21 is suspended substantially between the bars 12 with the major portion of the compartment 20 disposed in overhanging relation thereto and to one of the bars 12. This arrangement is somewhat economical of space in the trolley frame, but it will be understood that a regular arrangement of the compartments 20 and 21, that is one in which the compartments are not displaced with relation to each other, is deemed to be within the scope of my invention."

The first basket 19 having been placed in position as above described, succeeding baskets will likewise be carried by the rails 12 in a similar manner and with each basket occupying a reclining position with respect to the preceding basket in position. This reclining, stacked relation of the baskets within one tier thereof, that is a single group of baskets supported by a pair of rails such as 12, greatly increases the capacity of the trolley frame over similar methods heretofore employed and substantially approximates in this respect the capacity of a trolley in which the pieces of bacon are suspended from hooks.

The tier of baskets having been completed on the rails 12, a similar tier will be supported on the rails 13, but with the individual baskets in an opposite, inclined direction. The effect of alternately inclining the baskets in successive tiers throughout the depth of the frame insures that the smoke and hot gases during the smoking process will pursue a sinuous course in rising upwardly through the frame, being deflected from time to time by the impervious slabs of bacon. This manner of arranging the path of the smoke and hot gases through the trolley framework provides for a more effective and intimate contact of these elements with the surfaces of the bacon, than would otherwise be obtained.

In the modified cage member illustrated in Fig. 6, denoted generally by the numeral 35, said member comprises only an end portion 37 and a side portion 36 which are connected at their adjacent end edges to form a substantially L-shaped member. The lower edges of the portions 36 and 37, adjacent their separated ends, are provided with spring clips 59, similar to the clips 43 shown in Fig. 7, for the purpose of securing the members 35 in position. This type of cage member does not require any top portion, as shown and described in connection with the cage member 28, and is, therefore, somewhat more economical of material. In order to maintain the correct, relative position of the portions 36 and 37 and to prevent spreading thereof, a tie rod 38 is secured to the free ends of said portions adjacent the upper edges thereof. The use of the cage member 35 is identical with that of the member 28.

In Fig. 7 is illustrated a further modification of the cage member as indicated by the numeral 39. The member 39 is shaped generally similar to the member 28 and comprises a top 40, an end 41 and a side 42. The specific differentiation between the member 39 and the member 28 resides in the manner of maintaining the former cage member in position in one of the compartments of the basket and also in the mode of imparting a yieldable compression to the free marginal edges of the bacon. Specifically, this difference resides in the use of a pair of clips 43 which are secured at the upper ends thereof to a convenient horizontal rod 44 included within the end and side 41 and 42, respectively. The clips 43 are, preferably, formed of any suitable, springy material and their lower ends are bent slightly as at 45 for engagement with the rods 46 forming the bottom of one of the compartments of the basket. The cage member 39 compresses the bacon in the manner hereinbefore described and when a suitable force of compression has been applied to said bacon, the bent ends of the clips 43 will be engaged with the convenient rods 46 of the compartment bottom, thereby both securing the member 39 in position and also imparting a yieldable, compressive force to the edges of the bacon, while the character of the shaped ends permits ready disengagement of the cage from the basket.

A further suggestion for retaining the several cage members above described in position during handling of the baskets is illustrated in Fig. 9. Any of the cage members above described may have secured to a horizontal rod 47 provided in an end or side 48, as the case may be, one end of a hook member 49. The hook portion 50 at the opposite end of said member will be moved into engagement with a convenient rod 51 forming a part of the compartment bottom 52, as close as possible to the lower edge of the portion 48 thereby compressing the meat against the bottom of the compartment in a somewhat similar manner as does the spring 34 in Fig. 4.

In Fig. 10 is illustrated a modification of the cage member shown in Fig. 6, the former being denoted by the numeral 53 and consisting of a pair of portions 54 and 55, similar to the portions 36 and 37, respectively, in Fig. 6, which are secured together at their adjacent ends by hinges 56, thereby permitting a relative movement of the portions 54 and 55, as may be desirable for certain classes of meat, or may be required by peculiar operating conditions. Each of said portions is further provided with a pair of clips 57 secured thereto adjacent the opposite ends thereof and bent at their lower ends as at 58, the clips 57, therefore, being identical with the clips 43 heretofore described. The manner of application of the cage member 53 is similar to that described above for the other types of cage members, but it will be noted that the hinged form of construction permits a relative movement of the component parts of said member and, therefore, a more accurate positioning thereof.

Whichever of the above type of cage members are employed, it will be obvious that the steps of the process which comprise the initial shaping of the soft and pliable pieces of bacon will be effected with great rapidity, owing to the facility with which the cage members may be placed in position in the several compartments of the basket. As before stated, and dependent upon the method of loading the trolley with the baskets, it is contemplated that the several securing members may be entirely eliminated and the compressive force applied to the marginal edges of the bacon simply by the weight of the cage member and also that the several types of connecting and yieldable devices above described may be used in individual units, in pairs, or in any desired combination.

While I have shown one set of elements and combinations thereof for effectuating the foregoing structure, it will be understood that the same is intended for purpose of illustration only and in nowise to restrict my structure to the exact forms and combinations shown, for many changes may be made therein without departing from the spirit of my invention.

I claim:

1. The combination of a meat-receiving basket, and a cage member having a top, a side and end insertable in said basket, and means for connecting said member to said basket, said side and end compressibly engaging two marginal edges of the meat against the sides of said basket to thereby shape and define all marginal edges of the meat.

2. The combination of a meat-receiving basket, and a cage member having a top, a side and end insertable in said basket, and spring means for yieldably connecting said members to said basket, said side and end compressibly engaging two marginal edges of the meat against the sides of said basket to thereby shape and define all marginal edges of the meat.

3. The combination of a meat-receiving basket, and a cage member having a top, a side and end insertable in said basket for engagement with certain marginal edges of the meat and shiftable substantially in the plane of said meat for compressing and defining all marginal edges between said member and the walls of said basket.

4. The combination of a meat-receiving basket, a cage member having a top, a side and end insertable in said basket for engagement with certain marginal edges of the meat and shiftable substantially in the plane of said meat for compressing and defining all marginal edges between said member and the walls of said basket, and means for maintaining said member in the shifted position.

5. The combination of a meat-receiving basket, a cage member having a top, a side and end insertable in said basket for engagement with certain marginal edges of the meat and shiftable substantially in the plane of said meat for compressing and defining all marginal edges between said member and the walls of said basket, and yielding means for maintaining said member in the shifted position.

6. The combination of a meat-receiving basket, a cage member having a top, a side and end insertable in said basket for engagement with certain marginal edges of the meat and shiftable substantially in the plane of said meat for compressing and defining all marginal edges between said member and the walls of said basket, means for maintaining said member in the shifted position, and means connecting said basket and member for compressibly engaging said meat in a direction substantially normal to that exerted by said first named means.

7. The combination of a meat-receiving basket, a cage member having a top, a side and end insertable in said basket for engagement with certain marginal edges of the meat and shiftable substantially in the plane of said meat for compressing and defining all marginal edges between said member and the walls of said basket, yielding means for maintaining said member in the shifted position, and spring means connecting said basket and member for compressibly engaging said meat in a direction substantially normal to that exerted by said first named means.

8. The combination of a meat-receiving basket, a cage member insertable in said basket for engagement with certain marginal edges of the meat and shiftable substantially in the plane of said meat for compressing and defining all marginal edges between said member and the walls of said basket, yielding means for maintaining said member in the shifted position, and yielding means connecting said basket and member for compressibly engaging said meat in a direction substantially normal to that exerted by said first named means, both of said means being connected to said cage at a pair of opposite corners thereof.

9. The combination of a basket for supporting meat during a smoking process comprising a foraminous bottom, a foraminous end and side for receiving and defining two marginal edges of the meat to be compressed, and a foraminous cage member having a top, a side and end detachably connected to said basket for compressing and defining the other marginal edges of the meat between said basket and member.

10. The combination of a basket for supporting meat during a smoking process comprising a foraminous bottom, a foraminous end and side for receiving and defining two marginal edges of the meat to be compressed, and a foraminous cage member having a top, a side and end detachably and yieldably connected to said basket for compressing and defining the other marginal edges of the meat between said basket and member.

11. The combination of a basket for supporting meat during a smoking process comprising a pair of compartments each having a foraminous bottom, a foraminous end and side for receiving and defining two marginal edges of the meat to be compressed, the respective compartments being displaced in the direction of their length, and foraminous cage members, each having a top, a side, and end detachably connected to each compartment of said basket for compressing and defining the other marginal edges of the meat between the respective members and compartments.

12. In apparatus for shaping meats for smoking, the combination of a plurality of complementary-shaped, cage members forming when assembled a box-like enclosure for receiving a piece of flat meat therein, said members being shiftable substantially in the plane of the meat to shapingly engage with all marginal edges of the meat, and means for retaining the members in the adjusted position.

13. In apparatus for shaping meats for smoking, the combination of a plurality of complementary-shaped, cage members forming when assembled a box-like enclosure for receiving a piece of flat meat therein, said members being shiftable substantially in the plane of the meat to shapingly engage with all marginal edges of the meat, and spring means for yieldingly maintaining the members in the adjusted position.

In testimony whereof, I have subscribed my name.

ALONZO NEWTON BENN.